United States Patent
Kubo et al.

(10) Patent No.: US 6,934,036 B2
(45) Date of Patent: Aug. 23, 2005

(54) CONFIGURATION MEASURING APPARATUS AND METHOD

(75) Inventors: Keishi Kubo, Osaka (JP); Yukio Imada, Osaka (JP); Hiroyuki Takeuchi, Osaka (JP); Kouji Handa, Osaka (JP); Keiichi Yoshizumi, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 23 days.

(21) Appl. No.: 10/140,815

(22) Filed: May 9, 2002

(65) Prior Publication Data

US 2002/0196449 A1 Dec. 26, 2002

(30) Foreign Application Priority Data

May 10, 2001 (JP) .................................... 2001-139752

(51) Int. Cl.⁷ ............................................. G01B 9/02
(52) U.S. Cl. ....................................................... 356/493
(58) Field of Search ............................... 356/486, 489, 356/491, 493, 495, 498, 513

(56) References Cited

U.S. PATENT DOCUMENTS 4,334,778 A * 6/1982 Pardue et al. ............... 356/486
5,561,524 A * 10/1996 Yamasaki et al. ........... 356/493
6,163,379 A * 12/2000 de Groot ..................... 356/493

FOREIGN PATENT DOCUMENTS

JP        2000-283728       10/2000

* cited by examiner

Primary Examiner—Gregory J. Toatley, Jr.
Assistant Examiner—Michael A. Lyons
(74) Attorney, Agent, or Firm—Wenderoth, Lind & Ponack, L.L.P.

(57) ABSTRACT

Arranged on both sides of a thin plate are optical displacement gauges that irradiate measurement lights onto surfaces of the thin plate and receive the measurement lights reflected by the surface so as to measure displacements of the surfaces of the thin plate. Variation of thickness of the thin plate is obtained on the basis of the displacements of the surfaces of the thin plate measured by each of the optical displacement gauges. Each of the optical displacement gauges detects the displacement of a respective surface of the thin plate with high accuracy by irradiating the measurement light to the thin plate two times.

16 Claims, 8 Drawing Sheets

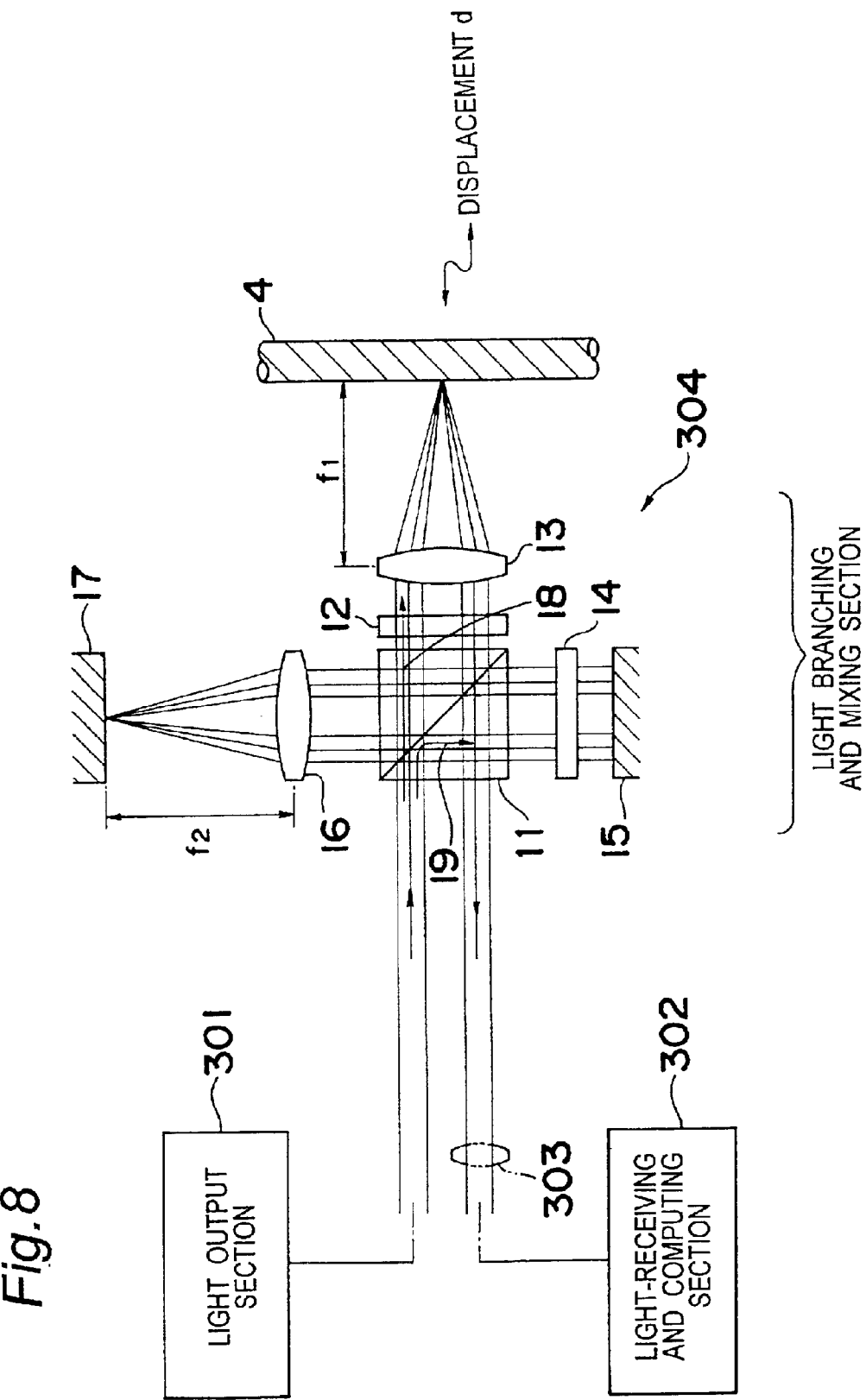

CONFIGURATION MEASURING APPARATUS AND METHOD

BACKGROUND OF THE INVENTION

The present invention relates to a configuration measuring apparatus and method, and particularly to an apparatus and method for measuring a surface shape of a thin plate member such as a wafer for manufacturing a semiconductor, in which little shape variation is required in a surface direction.

The wafer for manufacturing the semiconductor is constituted by a thin plate member such as a silicone wafer or the like. In order to form a semiconductor device or a circuit on a wafer surface, a photo engraving technique, a printing technique, various kinds of micro-fabrication techniques or the like is applied.

On the wafer to which such a working process is applied, it is important to increase a flatness of a surface. When flatness of the wafer is deteriorated, a pattern of the device or the circuit is unclearly formed, or a profile of a material to be printed onto the wafer surface in a pattern shape becomes indefinite, at a time of photo engraving. In particular, as a densification or a large-size of the semiconductor device or the circuit is promoted, the problem mentioned above becomes significant.

During a semiconductor manufacturing step, various kinds of processes are frequently executed in a state in which an entire surface of the wafer is supported in a closely contacted manner to a flat supporting surface by vacuum adsorption or the like. At this time, in a case that a thickness of the wafer has a dispersion, the dispersion of the thickness appears as a dispersion of the flatness of the wafer surface as it is at a time of supporting the wafer by the flat supporting surface in a closely contacted manner.

Accordingly, it is required that the dispersion or the variation in correspondence to this place is not generated in the thickness of the wafer. In order to estimate whether or not thickness variation of a manufactured wafer is large during a manufacturing step of the wafer or the like, it is necessary to accurately and efficiently measure the thickness variation of the wafer.

As a conventional wafer thickness variation measuring method, there is a technique described in Japanese Patent Application Laid-Open No. 2000-283728. With this technique, a displacement of wafer surfaces with respect to optical sensors arranged on side portions of both surfaces of a disc-like wafer is determined while rotating the wafer in a perpendicularly oriented state, whereby a magnitude of thickness variation of the wafer is calculated from the displacement of the wafer surfaces measured by the optical sensors. Scanning the wafer in a radial direction thereof by the optical sensors attains measurement of the thickness variation with respect to entire surfaces of the wafer.

The conventional wafer thickness variation measuring apparatus mentioned above has a limit in accuracy of measuring thickness variation, so that the apparatus cannot achieve measuring of the thickness variation with high accuracy required for manufacturing a semiconductor device or a circuit having high accuracy and density in the future.

In an optical displacement gauge used in the measuring apparatus, a change of distance between a respective one of the optical sensors and the wafer generates a interference signal of a sine wave shape with a cycle that is one half of a wavelength λ of a laser beam. In order to maintain a standard length and a traceability regulated in ISO, a frequency stabilized He—Ne laser having a wavelength of about 633 nm is used as a laser beam for measurement. In order to execute the measurement in accordance with the method mentioned above, an intensity of the sine-wave interference signal is detected in an analog manner, and a distance within a wavelength of $\mu/2$ is detected by performing a computation.

However, since the sine-wave interference signal is generated by utilizing a polarization property of light, the interference signal has a slight shift with respect to an ideal sine-wave waveform due to a significantly little polarized light leakage or the like, in an optical part such as a $\mu/4$ wavelength plate, or the like, used in a conventional optical displacement gauge, thereby generating an error in measuring a distance.

In correspondence to that density of a semiconductor device or circuit has become higher recently, a measurement of wafer thickness variation at an accuracy of not less than 0.0015 $\mu$m will be required in the near future. Owing to the measurement-principle thereof, such highly accurate thickness variation measurement as mentioned above is hardly possible. In a conventional optical sensor, an accuracy of about 0.003 $\mu$m is a limit.

Besides a wafer for manufacturing the semiconductor device, there are technical fields in which a significantly high accuracy in measurement of thickness variation is required, such as a substrate for a magnetic disc.

Therefore, an object of the present invention is to attain measurement of a thickness variation of a thin plate, such as a wafer, with high accuracy and high efficiency.

SUMMARY OF THE INVENTION

In a configuration measuring apparatus and method in accordance with the present invention, arranged on both sides of a thin plate are optical displacement gauges that irradiate measurement lights onto surfaces of the thin plate and receive the measurement lights reflected from the surfaces so as to measure displacements of the surfaces of the thin plate. Variation of thickness of the thin plate is obtained on the basis of the displacements of the surfaces of the thin plate measured by each of the optical displacement gauges. Further, in the apparatus and method in accordance with the present invention, each of the optical displacement gauges detects displacement of a respective surface of the thin plate with high accuracy by irradiating the measurement light to the thin plate two times.

DESCRIPTION OF THE DRAWINGS

Further objects and advantages of the present invention will become clear from the following description taken in conjunction with the preferred embodiments thereof with reference to the accompanying drawings, in which:

FIG. 4B is a graph showing an operation of the optical displacement gauge with

DETAILED DESCRIPTION OF THE PREFERRED EMBODIMENTS

Figure 1:
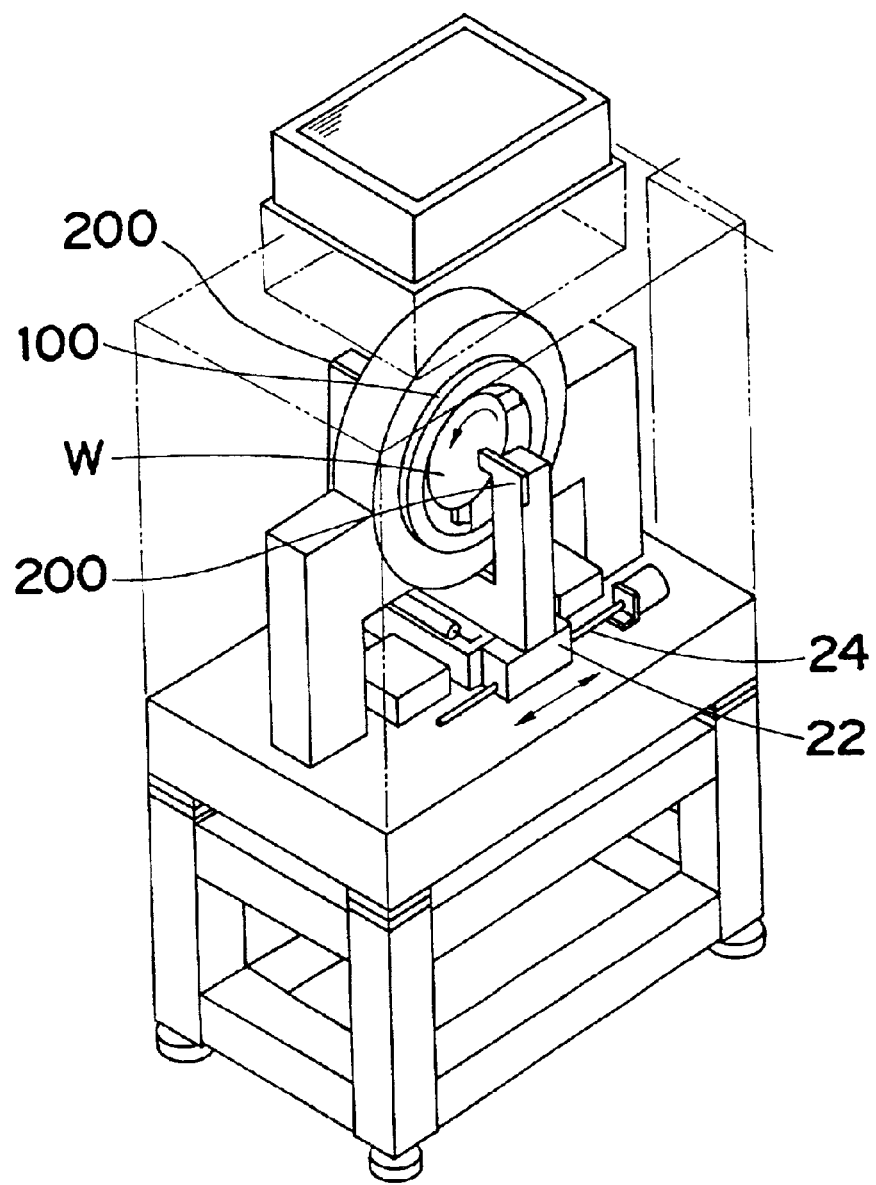
FIG. 1 is a perspective view of an entire configuration measuring apparatus.

FIG. 1 is a schematic view of a configuration measuring apparatus, and in particular shows a thickness variation measuring apparatus for a semiconductor wafer. A wafer, or a thin plate, w is held by a ring-like hollow spindle 100 in a state of being vertically oriented, and rotated within a vertical plane by a rotational drive of the hollow spindle 100. Optical displacement gauges 200 are respectively arranged at side portions of both surfaces of the wafer w. The optical displacement gauges 200 are mounted so as to freely move in a direction parallel to the surfaces of the wafer w, and thereby a measured position of displacement by the optical displacement gauges 200 moves right and left on a radius of the wafer w. Specifically, a mounting table 22 of the optical displacement gauges 200 is linearly moved by a rotational drive of a ball screw 24. By combining rotation of the thin plate and movement along a radial direction thereof by the optical displacement gauges, a measurement covering entire surfaces of the thin plate is achieved. The same function can be achieved by an optical system in which an irradiation position of a measurement light onto the thin plate, and a receiving position of a reflected light, are changed without moving a main body of the optical displacement gauge. Such a scanning measurement is suitable for an efficient quality control or the like on a shop-floor.

By adding displacements on both surfaces of the thin plate as measured by the optical displacement gauges, a variation of thickness of the thin plate can be determined. A thickness variation computing device for executing processing so as to determine the thickness variation of the thin plate can be constituted by an electronic circuit. The processing procedure is programmable by using a processing apparatus such as a microcomputer or the like.

The thin plate may be made of various kinds of materials and have various kinds of shape dimensions so long as it requires measurement of thickness variation with high accuracy. The thin plate may be made of a conductive material or an insulating material. A material in which a quality of material or an electrical property is different in accordance with a place thereof may be employed. A laminate constituted by a plurality of materials may be employed.

Specifically, a metal plate, a ceramic plate, a resin plate and the like, which constitute a material of a semiconductor wafer magnetic disc such as silicon or the like, may be employed. A shape of the thin plate may be shapes other than circular, although the wafer or thin plate is often formed of a circular plate shape or a disc shape. The surface of the thin plate preferably has a fine reflecting property such as a mirror surface or the like.

In a case of using a sensing pin reflector, the surface of the thin plate may have no reflecting property.

Used as the optical displacement gauge, is a measuring device or apparatus having a function of measuring a distance to a subject to be measured, or a distance change, so as to measure displacement of the surface of the subject by irradiating a measurement light onto the subject and receiving the measurement light reflected from the surface of the subject.

Figure 2:
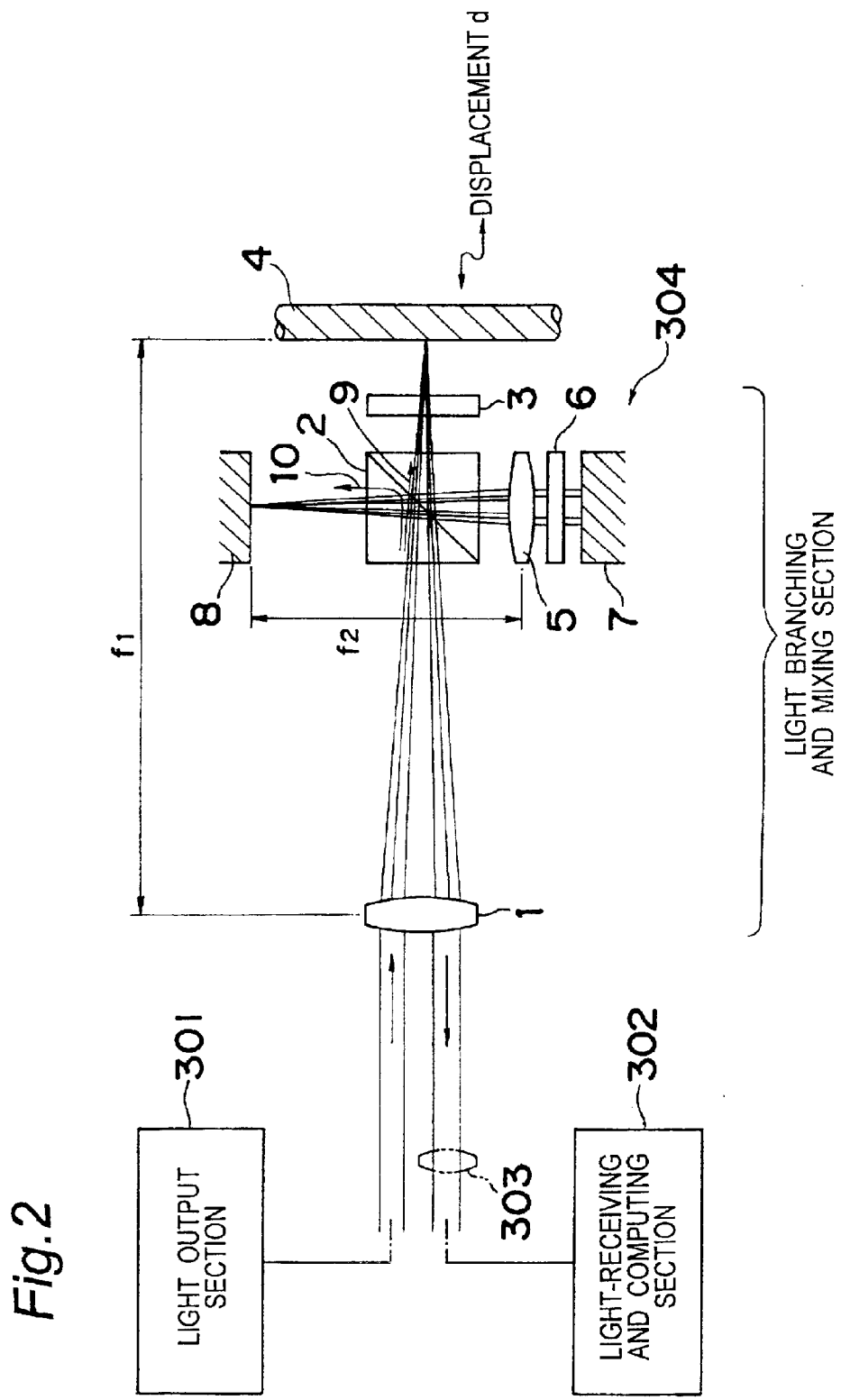
FIG. 2 is a detailed structural view of a main portion of a configuration measuring apparatus in accordance with a first embodiment of the present invention.

FIG. 2 shows a structure of an optical displacement gauge of a configuration measuring apparatus in accordance with a first embodiment of the present invention. The illustrated structure is for measuring a thin plate principally by a light having a spot diameter of approximately 0.1 mm.

As shown in FIG. 2, a linear polarization laser beam having a single wavelength emitted from a light output section 301, which has a laser beam stabilized in a frequency so as to have wavelength $\lambda$ as a light source, is set at its polarization surface at an angle of 45 degrees with respect to polarization beam splitter 2, and therefore branched into a measurement light and a reference light by the polarization beam splitter 2 after passing through lens 1. If the laser beam were passed through an optical center of the lens 1, it would be reflected and returned by a thin plate 4 or a mirror 8 along the same path. Thus, the laser beam is passed through the lens 1 at a position having an offset, larger than a beam diameter, with respect to the optical center of the lens 1.

The measurement light branched by the polarization beam splitter 2 is irradiated onto the thin plate 4 through a $\lambda/4$ wavelength plate 3 to be reflected at a first time.

Then, the light is transmitted along the following path so that the light is again irradiated onto the thin plate 4 for an accurate measurement. Namely, the light reflected from the thin plate 4 is again transmitted through the $\lambda/4$ wavelength plate 3, thereby its polarization direction is changed by 90 degrees, and the light is again passed through the polarization beam splitter 2 to be reflected in a direction different from its incident direction. The light is collimated by passing through a lens 5. This is because a focal distance of the lens 5 is coincided with a distance from a reflection position of the thin plate 4 to the lens 5. Then, the light is irradiated to a mirror 7 through a $\lambda/4$ wavelength plate 6. The light reflected from the mirror 7 is again passed through the $\lambda/4$ wavelength plate 6, resulting in a rotation of a polarization surface by 90 degrees. Thereafter, the light is passed through the polarization beam splitter 2 through the lens 5, and is transmitted in a direction different from its incident direction due to a change of its polarization surface. The transmitted light is reflected by the mirror 8 arranged at a position of the focal point, and is again passed through the polarization beam splitter 2. Then, the light is collimated by again passing through the lens 5, and is irradiated to the mirror 7 through the $\lambda/4$ wavelength plate 6. The light reflected by the mirror 7 is again passed through the $\lambda/4$ wavelength plate 6 resulting in a rotation of the polarization surface by 90 degrees. Thereafter, the light is passed through the polarization beam splitter 2 through the lens 5, and is reflected in a different direction due to change of its polarization surface. The reflected light is again irradiated to the same portion of the thin plate 4 through the $\lambda/4$ wavelength plate 3, thereby a reflection at a second time is performed.

Further, in order to introduce the light to a light-receiving and computing section 302 for measuring the light, a polarization direction is changed by again passing the light through the $\lambda/4$ wavelength plate 3, and the light passes through the polarization beam splitter 2, again passes through the lens 1 and is introduced to the received light computing portion as a measurement light 9.

A reference light, which is interfered with the measurement light 9 having a phase changed due to a change of position of the thin plate 4 so as to generate an interference fringe is produced in accordance with the following procedures.

Namely, a reference light reflected in a direction of 90 degrees by the polarization beam splitter 2 so as to be branched is reflected by the mirror 8, and is again passed through the polarization beam splitter 2. Then, the reference light is reflected toward the lens 1, and is introduced to the light-receiving and computing section as a reference light 10.

The light-receiving and computing section 302 receives a mixed light of the measurement light 9 and the reference light 10, and performs a computing process for computing phase differences so as to measure displacements of a surface of the thin plate.

In this apparatus, a travel of the measurement light is changed on the basis of a difference of a distance from the optical displacement gauge to the surface of the thin plate 4, whereas a travel of the reference light is constant. Accordingly, displacement of the surface of the thin plate can be determined by measuring a difference of travel between the measurement light and the reference light.

The measurement light 9 is transmitted to the thin plate surface at two times, and a displacement d of position of the thin plate surface can be accurately detected as a displacement of an optical path of 4d by the light-receiving and computing section 302.

The light output section 301 produces the reference light and the measurement light with wavelengths accurately controlled by a laser beam stabilized in frequency. A light branching and mixing portion 304 is constituted by an optical system such as the polarization beam splitter, the $\lambda/4$ wavelength plate, the mirror and the like. The light-receiving and computing section 302 is constituted by a photoelectric transfer element, a processing circuit for electric signals, an arithmetic operation circuit and the like.

As a particular structure of the apparatus mentioned above, there can be applied a technique of a three-dimensional configuration measuring apparatus as disclosed in Japanese Patent Application Laid-Open No. 3-255907 by the present inventors.

The lens 1, which converges the output light to be supplied to the light branching and mixing section 304, can be provided between the light output section 301 and the light branching and mixing section 304.

The lens 1 functions to focus the measurement light irradiated to the thin plate 4 so that the measurement light is irradiated only to a narrow area of the thin plate 4 for increasing measurement accuracy. By arranging the lens 1 between the light output section 301 and the light branching and mixing section 304, and not between the light branching and mixing section 304 and the thin plate 4, it is possible to make travel from the light branching and mixing section 304 to the thin plate 4 short so as to reduce an influence of fluctuation of air interposed between the optical displacement gauge and the thin plate. Further, since the distance from the lens to the thin plate can be set long, it is possible to make a spot diameter on the thin plate small to about 0.1 mm, resulting in accurate measurement at an area within 1 mm from an outer periphery of the thin plate.

Further, a convergent optical system constituted by a focus lens converging the mixed light and supplying it to the light-receiving and computing section 302 may be provided between the light branching and mixing section 304 and the light-receiving and computing section 302. The convergent optical system is constituted by optical members such as the lens, the mirror and the like. The convergent optical system improves an accuracy of measurement due to accurate receipt of the mixed light by a light receptive surface of the light-receiving and computing section 302. Generally, since the surface of the thin plate has an incline, the measurement light reflected on the surface of the thin plate has an incline or a deviation with respect to the optical path to the light-receiving and computing section 302. The incline or the deviation disturbs accurate receipt of the measurement light by the light receptive surface of the light-receiving and computing section 302. The convergent optical system provides secure convergence of the measurement light on the light receptive surface even if the incline or the deviation is generated.

[Measuring Operation]

Figure 3:
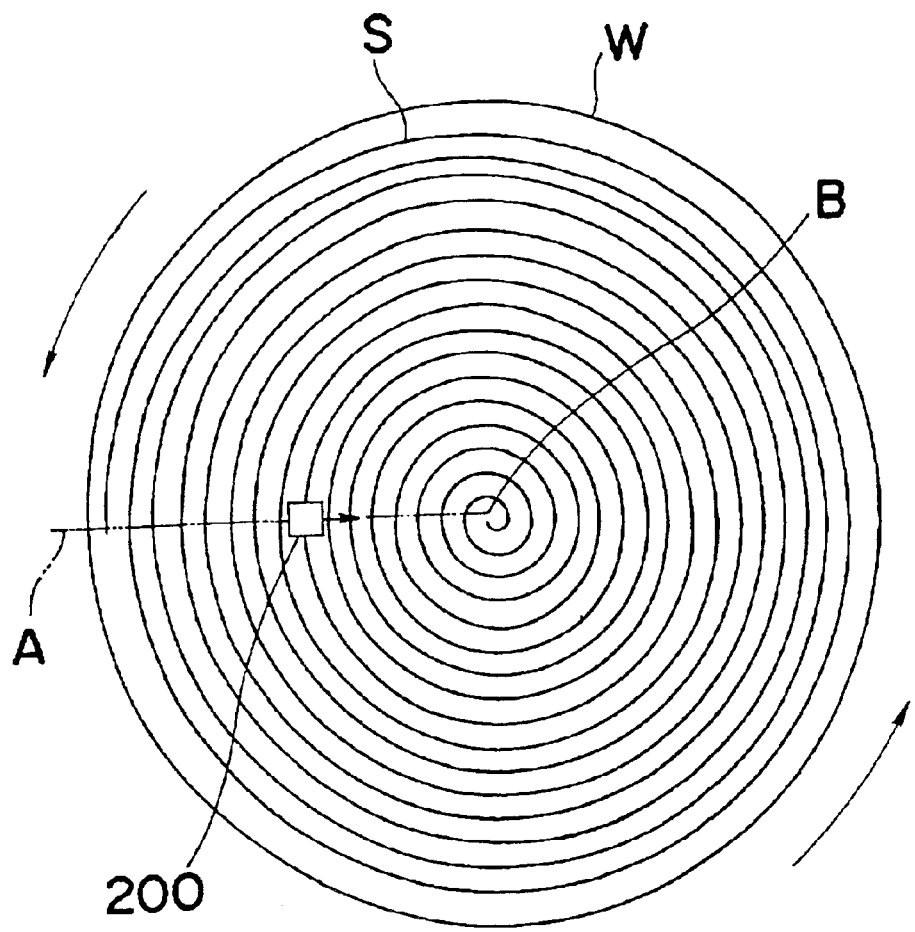
FIG. 3 is a schematic view illustrating a measuring operation of a wafer.

FIG. 3 is a view describing a method of performing a measurement of surface displacement with respect to an entire surface of a wafer w by the optical displacement gauge 200. The wafer w is rotated in one direction in a vertical direction as shown in FIG. 1. While the optical displacement gauge 200 is being moved in a radial direction from an outer periphery A of the wafer w toward a center B, the measurement of the surface displacement is performed. Accordingly, a position of the optical displacement gauge 200 moves along a spiral line shown by a locus S, with respect to the wafer w. By performing the measurement of the surface displacement by the optical displacement gauge 200 on the locus S with a suitable interval, it is possible to efficiently execute the measurement of the surface displacement with respect to the entire surface of the wafer w. Since it is sufficient to linearly move the optical displacement gauge 200 in a horizontal direction a distance of radius A–B, a moving mechanism of the optical displacement gauge 200 becomes simple.

[Acceleration and Reduction Process]

Although the measurement of the surface displacement of the wafer w may be performed after starting the rotation of the wafer w and the rotational speed becomes constant, a method described below is more efficient.

Figure 4A:
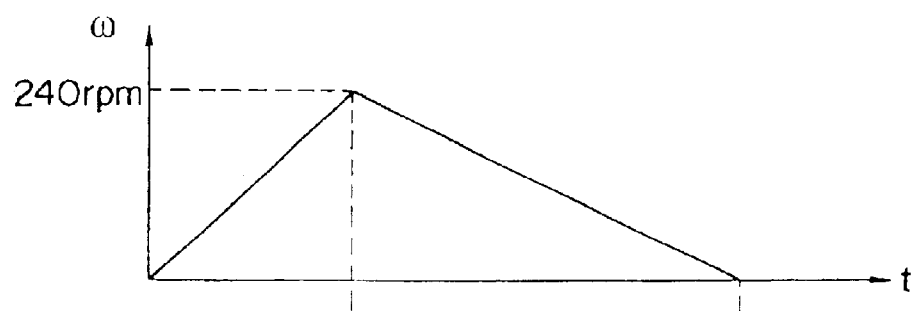
FIG. 4A is a graph showing an operation of the wafer with time.
Figure 4B:
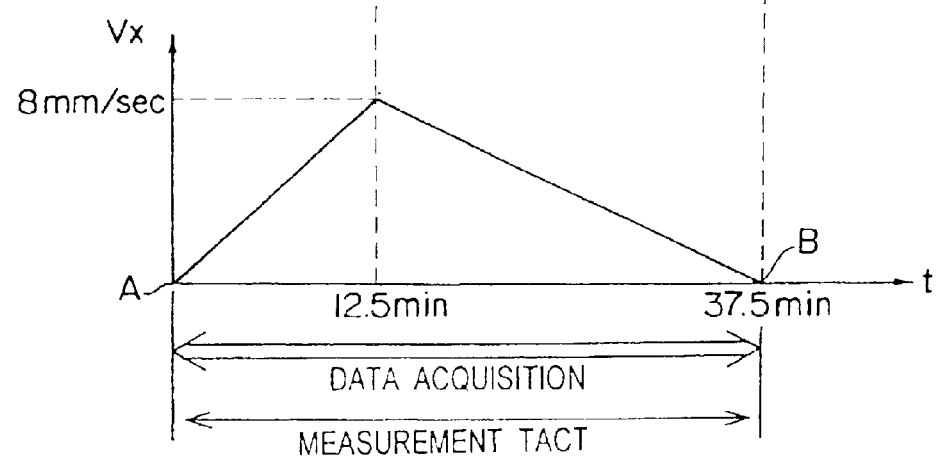

FIG. 4A shows a change of rotational speed (angular velocity $\omega$) of wafer w during one measurement tact, and FIG. 4B shows linear moving speed Vx of the optical displacement gauge. When the wafer w held by the hollow spindle is rotated by a motor or the like, it is impossible to immediately achieve a predetermined rotational speed at a time of starting the rotation due to a moment of inertia of the wafer w, a rotating member of the hollow spindle and the like. The rotational speed co is gradually increased from a state of rotational speed $\omega$=0 so as to reach a predetermined speed after a given time. When the rotation is stopped after the measurement is finished, the rotational speed $\omega$ is gradually reduced so as to be returned to 0 after a given time has passed.

In the same manner, with respect to the linear movement of the optical displacement gauge, the speed is gradually increased from a state of speed Vx=0 when starting the movement, and the speed Vx is gradually reduced to be returned to 0 when finishing the movement.

If the measurement were performed while the rotational speed $\omega$ of the wafer w is constant, a time for acceleration before starting the measurement and a time for reduction after finishing the measurement would be required in addition to an inherent measuring time, resulting in a long measurement time. Therefore, as shown in FIGS. 4A and 4B, the linear movement of the optical displacement gauge is started at the same time of starting the rotation of the wafer w, and a displacement measurement by the optical displacement gauge (data acquisition) is also started.

By synchronizing motions of the wafer w and the optical displacement gauge 200, it is possible to relatively move the wafer w and the optical displacement gauge 200 along the spiral locus S shown in FIG. 3. This synchronization is achieved by detecting the rotational speed of the wafer w and the linear moving speed or the moving position of the optical displacement gauge 200 by sensors such as a rotary encoder, a position sensor or the like, arithmetically processing these detected speeds by a computing device such as a microcomputer or the like, and controlling driving motors or the like for the wafer w and the optical displacement gauge on the basis of results of this arithmetical process. Further, the displacement measurement is executed by the optical displacement gauge at every predetermined position set on the locus S.

The optical displacement gauge 200 starts moving from an outer peripheral position A of the wafer w. As shown in FIG. 4B, the moving speed Vx is increased until the optical displacement gauge reaches near a middle of the radius A–B from the outer peripheral position A, and is immediately reduced when the speed reaches a given speed (for example, Vx=8 mm/sec$^2$). The optical displacement gauge is stopped at central portion B. As shown in FIG. 4A, the rotational speed ω of the wafer w is accelerated to its maximum value (for example, ω=240 rpm) synchronously with the moving speed Vx of the optical displacement gauge after starting the rotation until the moving speed Vx reaches its peak value, and is reduced from the time when the moving speed Vx reaches its peak value. The rotation of the wafer w is stopped at a time when the optical displacement gauge stops moving.

In accordance with the operation mentioned above, the measurement tact is remarkably reduced in comparison with the method of starting the measurement after the rotational speed reaches a predetermined value, and reducing the rotational speed to stop after the measurement is finished.

[Sensing Pin Reflector]

In the case of measuring the surface displacement of the thin plate by the optical displacement gauge, a poor reflection property of the surface of the thin plate causes an insufficient reflection of the measurement light, resulting in difficulty of measurement and inaccuracy of a measurement result. Dispersion of the reflection property in accordance with the place on the surface of the thin plate easily generates dispersion of measurement results.

By providing a sensing pin reflector, the problem caused by the reflection property of the surface of the thin plate can be solved. The sensing pin reflector is brought into contact with the surface of the thin plate, moves following the displacement of the surface of the thin plate, and has a reflection surface reflecting the measurement light.

The sensing pin reflector generally has a contact element having a fine tip end made of a hard material such as a diamond or the like, and a reflection surface arranged on a back surface of the contact element and finished in a mirror surface having a high reflection rate. In order to make it possible to move the sensing pin reflector in a contact and non-contact direction following the surface of the thin plate, the structure can be made so as to support the contact element and the reflection surface by a supporting arm constituted by a spring plate or the like and being elastically deformable in a cantilever manner, thereby making it possible to move the contact element and the reflection surface due to an elastic deformation of the spring plate. A parallel plate-like supporting arm constituted by a pair of parallel plate pieces arranged parallel to the surface of the thin plate, and with an interval therebetween, can be employed as the supporting arm. A parallelogram mechanism constituted by the pair of parallel plate pieces is a so-called parallel link mechanism structure. When deforming the parallel plate-like supporting arm supporting the contact element due to displacement of the thin plate, the pair of plate pieces are deformed while maintaining a parallelogram, thereby maintaining a parallel state. The contact element and the reflection surface supported at a front end of the parallel plate-like supporting arm move in parallel while maintaining their posture. Since the posture of the contact element and the reflection surface is not changed, it is possible to reflect the measurement light in the same direction accurately, resulting in reduction of inclination and shift of the measurement light received by the light-receiving section.

Figure 5:
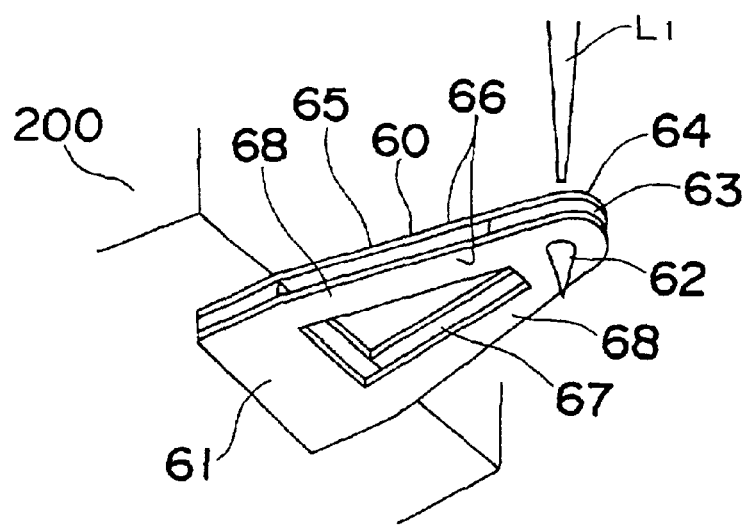
FIG. 5 is a perspective view of a sensing pin reflector.
Figure 6:
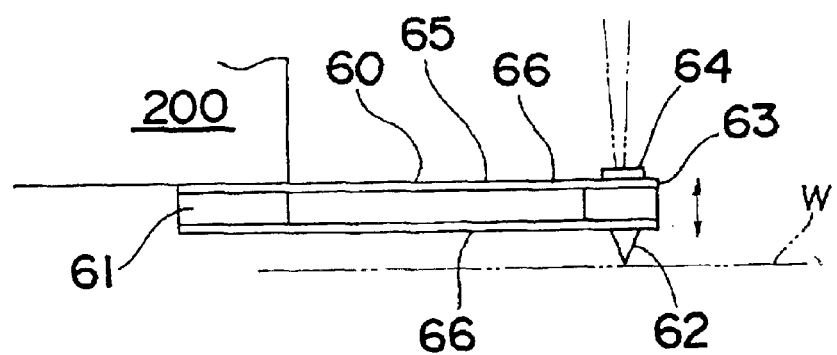
FIG. 6 is a side elevational view of the sensing pin reflector.
Figure 7:
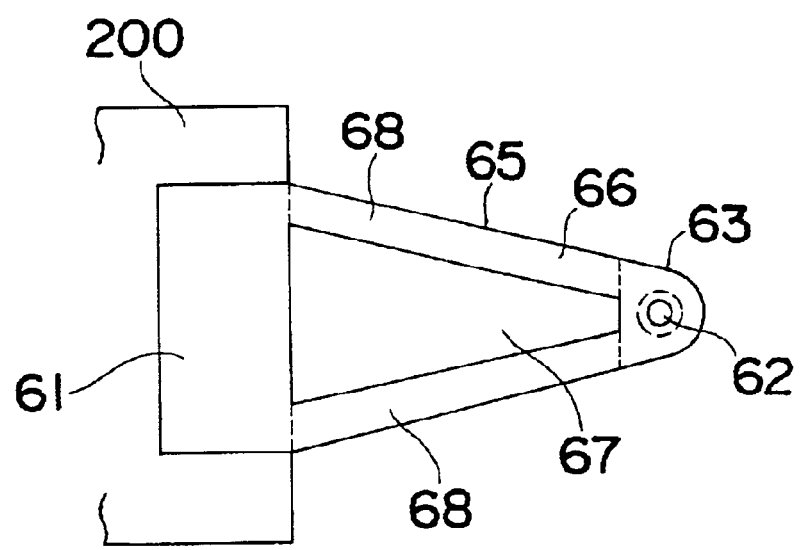
FIG. 7 is a bottom elevational view of the sensing pin reflector.

As shown in FIGS. 5 to 7, a sensing pin reflector 60 comprises a base portion 61 mounted to a front end, at a side of the wafer w, of the optical displacement gauge 200, a responding portion 63 having a contact element 62 and a reflection surface 64, and a parallel plate-like supporting arm 65 connecting the sensing pin reflector 60 and the responding portion 63.

The contact element 62 is made of diamond, has a thin tip end of about 10 μm in diameter, and is substantially contacted with a surface of the wafer w at its tip end in accordance with a point contact. The reflection surface 64 is constituted by a mirror surface of a glass or a metal, and efficiently reflects the measurement light. The reflection surface 64 is normally opposed to an irradiating direction of the measurement light, and the tip end of the contact element 62 is arranged in an extending direction of the irradiating direction of the measurement light.

As shown in FIG. 6, the parallel plate-like supporting arm 65 comprises two plate pieces 66 made of an elastically easily deformable material such as a spring plate or the like, arranged in parallel with a vertical space therebetween. These two parallel plate pieces 66 are fixed to each other at the base portion 61 and the responding portion 63, constituting a parallelogram link mechanism or a so-called parallel link mechanism. The plate pieces 66 are manufactured from a leaf spring material, and for example has a thickness of about 10 μm and a length of about 10 mm.

As shown in FIG. 7, an outer shape of each plate piece 66 in a plan view is trapezoidal, which is wide at a side of the base portion 61 and narrow at a side of the responding portion 63, and a cutout portion 67 formed of a smaller trapezoidal shape passes through a center of the plate piece. The remainder of the plate piece 66 is structured such that narrow band portions 68 arranged on right and left sides with a space therebetween are arranged in a tapered configuration which becomes wide at the side of the base portion 61 and narrow at the side of the responding portion 63.

In the sensing pin reflector 60 having the structure mentioned above, upward displacement of the surface of the wafer w with respect to the optical displacement gauge 200 results in the contact element 62 being pressed by the surface of the wafer w and moved upwardly so as to press upwardly the parallel plate-like supporting arm 65. Since the upper and lower plate pieces 66, constituting the parallelogram link mechanism mentioned above are independently deformed so as to warp to an upper side while maintaining parallelism, the responding portion 63 moves upwardly and downwardly while substantially maintaining a parallel state with respect to the base portion 61. Since the reflection surface 64 provided at the responding portion 63 also moves in parallel, it moves vertically while maintaining a state of normally opposing measurement light $L_1$. As a result, the reflection light can always be returned in the same direction as the incident direction of the measurement light irrespective of displacement of the surface of the wafer w.

There is a possibility that the surface displacement of the wafer w is generated in both of upward and downward directions. By lightly pressing the sensing pin reflector 60 against the surface of the wafer w previously so as to execute a measurement while maintaining elastic deformation of the parallel plate-like supporting arm 65, it is possible to securely bring the contact element 62 into contact with the wafer w with respect to surface displacement in both of the upward and downward directions. Specifically, the parallel plate-like supporting arm 65 may be arranged so as to be elastically deformed by about 100 μm.

When the direction of the reflection light of the measurement light is inclined or shifted, it becomes hard to securely receive the light by the light receptive surface of the light-receiving section as mentioned above. However, the sensing pin reflector 60 using the parallel plate-like supporting arm 65 constituting the parallelogram link mechanism mentioned above makes it hard to generate the incline or the displacement of the reflection light. Further, the parallel plate-like supporting arm 65 having the tapered structure constituted by the right and left band portions 68 effectively prevents the inclination of the responding portion 63 in the right and left directions of the tapered shape, and a torsion of the parallel plate-like supporting arm 65, so that it is possible to suitably maintain the reflecting direction of the measurement light.

A function of preventing the reflection light from being inclined or shifted corresponds to a common function of the focus lens 303 mentioned above. Accordingly, if the sensing pin reflector 60 is provided, a desired function can be achieved without the focus lens. However, if the focus lens is also provided in addition to the sensing pin reflector 60, it is possible to achieve a higher function.

Further, by using the sensing pin reflector 60, it is possible to achieve a reflecting function, at a higher efficiency, of the reflection surface 64. Even in the case that the surface of the wafer w is made of the material having a low reflection factor, or has a structure in which a reflection factor is different in accordance with places on the surface of the wafer, an accurate and stable displacement measurement is achieved by reflecting the measurement light by the reflection surface 64 having high and stable reflectivity.

Figure 8:
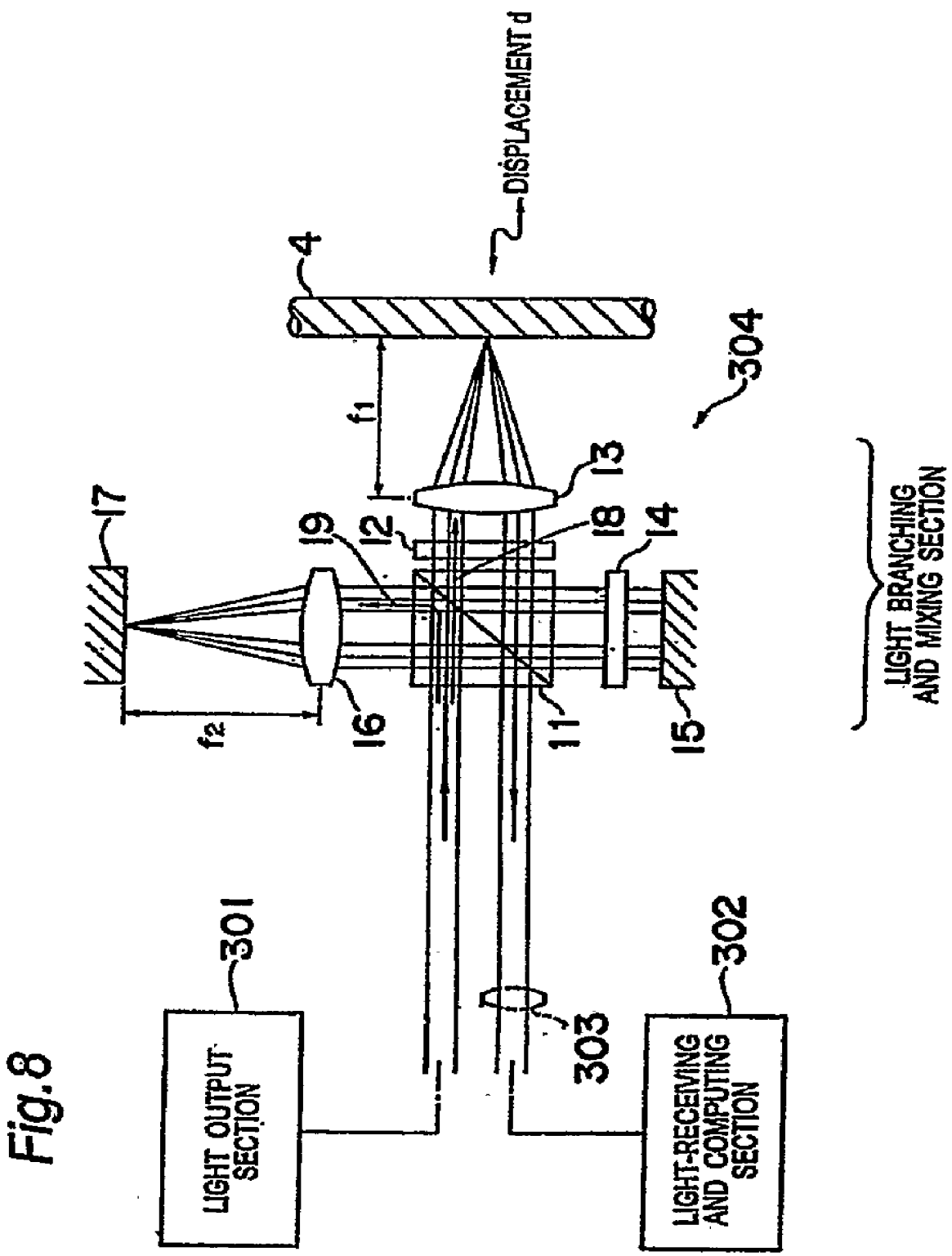
FIG. 8 is a detailed structural view of a main portion of a configuration measuring apparatus in accordance with a second embodiment of the present invention.

FIG. 8 shows a structure of an optical displacement gauge of a configuration measuring apparatus in accordance with a second embodiment of the present invention. The illustrated structure is for measuring a thin plate principally by a light having a spot diameter of about 0.01 mm.

As shown in FIG. 8, a linear polarization laser beam having a single wavelength emitted from a light output section 301, which has a laser beam stabilized in a frequency so as to have wavelength ω as a light source, is set with its polarization surface at an angle of 45 degrees with respect to polarization beam splitter 11, and therefore is branched into a measurement light and a reference light by the polarization beam splitter 11. Thereafter, the measurement light is passed through a lens 13 through a λ/4 wavelength plate 12. If the laser beam were passed through an optical center of the lens 13, it would be reflected and returned by a thin plate 4 along the same path. Thus, the laser beam is passed through the lens 13 at a position having an offset larger than a beam diameter with respect to the optical center of the lens 13.

The measurement light branched by the polarization beam splitter is irradiated onto the thin plate 4 via the lens 13 to be reflected at a first time.

Then, the light is transmitted along the following path so that the light is again irradiated onto the thin plate 4 for an accurate measurement. The light reflected from the thin plate 4 is again transmitted through the lens 13 and the λ/4 wavelength plate 12, thereby its polarization direction is changed by 90 degrees, and the light is again passed through the polarization beam splitter 11 to be reflected in a direction different from its incident direction. The light reflected by the polarization beam splitter 11 is irradiated to a mirror 15 through a λ/4 wavelength plate 14. The light reflected from the mirror 15 is again passed through the λ/4 wavelength plate 14, resulting in a rotation of its polarization surface by 90 degrees. Due to the rotation of the polarization surface, the light is transmitted through the polarization beam splitter 11. The transmitted light is irradiated onto a mirror 17 by a lens 16 at a focal point of the lens 16. For the same reason as in the case of the lens 13, the light is passed through the lens 16 at a point having an offset larger than a beam diameter with respect to an optical center of the lens 16. The light is reflected by the mirror 17, collimated by the lens 16, again transmitted through the polarization beam splitter 11, and irradiated to the mirror 15 through the λ/4 wavelength plate 14. The light reflected by the mirror 17 is again passed through the λ/4 wavelength plate 14 resulting in a rotation of its polarization surface by 90 degrees. Due to the change of the polarization surface, the light is reflected in a different direction by the polarization beam splitter 11. The reflected light is again irradiated to the same portion of the thin plate 4 through the λ/4 wavelength plate 12, thereby a reflection at a second time is performed.

Further, in order to introduce the light to a light-receiving and computing section 302 for measuring the light, the polarization direction is changed by again passing the light through the λ/4 wavelength plate 12 after collimating the light by the lens 13, and the light passes through the polarization beam splitter 11 to be introduced to the received-light and computing section 302 as a measurement light 18.

A reference light which is interfered with the measurement light 18, having a phase changed due to a change of position of the thin plate 4 so as to generate an interference fringe, is produced in accordance with the following procedures.

The reference light, reflected in a direction of 90 degrees by the polarization beam splitter 11 so as to be branched, is focused on the mirror 17 through the lens 16 so as to be reflected, and is again passed through the polarization beam splitter 11 through the lens 16. Then, the light changes its direction so as to be introduced to the light-receiving and computing section 302 as a reference light 19.

The light-receiving and computing section 302 receives a mixed light of the measurement light 18 and the reference light 19, and performs a computing process for computing phase differences so as to measure displacements of the surface of the thin plate.

In this apparatus, a travel of the measurement light is changed on the basis of a difference of a distance from the optical displacement gauge to the surface of the thin plate 4, whereas a travel of the reference light is constant. Accordingly, displacement of the surface of the thin plate can be determined by measuring a difference of travel between the measurement light and the reference light.

The measurement light 18 is transmitted to the thin plate surface at two times, and a displacement d of position of the thin plate surface can be accurately detected as a displacement of an optical path of 4d by the light-receiving and computing section 302.

The lens 13, which converges output light so as to supply the light to the thin plate, can be provided between light branching and mixing section 304 and the thin plate.

The lens 13 has a function of narrowing measurement light irradiated to the thin plate, irradiating the measurement light only in a narrow range of the thin plate and increasing a measurement accuracy. The lens 13 functions to focus the measurement light irradiated to the thin plate 4 so that the measurement light is irradiated only to a narrow area of the thin plate 4 for increasing measurement accuracy. Further, since the distance from the lens 13 to the thin plate 4 can be set to be small, it is possible to make a spot diameter on the thin plate small to about 0.01 mm, resulting in accurate measurement including measurement of surface roughness of the thin plate.

Further, a convergent optical system constituted by a focus lens converging the mixed light and supplying it to the light-receiving and computing section 302 may be provided between the light branching and mixing section 304 and the light-receiving and computing section 302. The convergent optical system is constituted by optical members such as a lens, mirror and the like. The convergent optical system improves an accuracy of measurement due to accurate receipt of the mixed light by a light receptive surface of the light-receiving and computing section 302. Generally, since the surface of the thin plate has an incline, the measurement light reflected from the surface of the thin plate has an incline or a deviation with respect to an optical path to the light-receiving and computing section 302. The incline or the deviation disturbs accurate receipt of the measurement light by the light receptive surface of the light-receiving and computing section 302. The convergent optical system provides secure convergence of the measurement light on the light receptive surface even if the incline or the deviation is generated.

Figure 9:
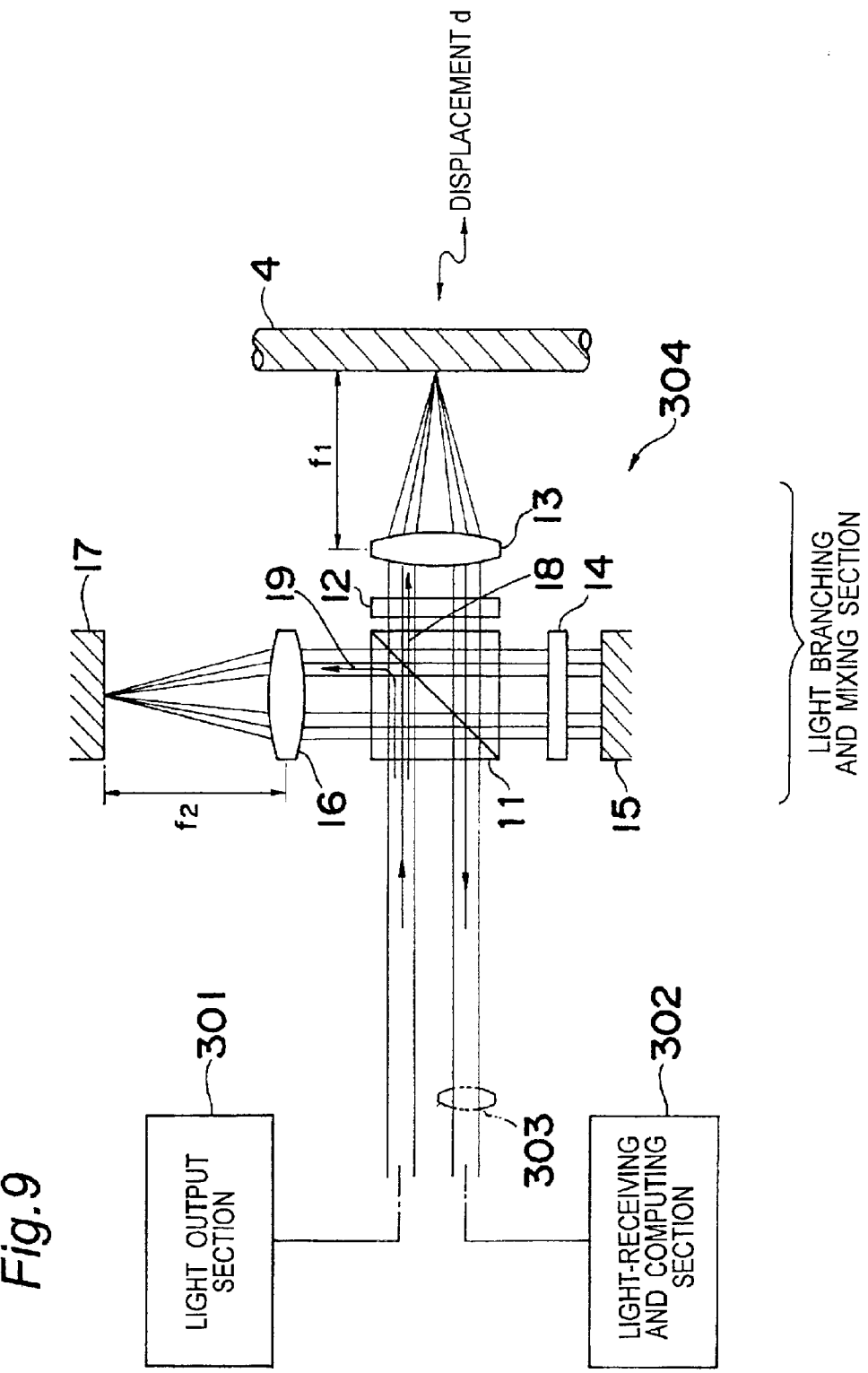
FIG. 9 is a detailed structural view of a main portion of a configuration measuring apparatus in accordance with a third embodiment of the present invention.

FIG. 9 shows a structure of an optical displacement gauge of a configuration measuring apparatus in accordance with a third embodiment of the present invention. The illustrated structure is for measuring a thin plate principally by a light having a spot diameter of approximately 0.01 mm.

As shown in FIG. 9, a linear polarization laser beam having a single wavelength emitted from a light output section 301, which has a laser beam stabilized in a frequency so as to have wavelength $\lambda$ as a light source, is set with its polarization surface at an angle of 45 degrees with respect to polarization beam splitter 11, and therefore is branched into a measurement light and a reference light by the polarization beam splitter 11. Thereafter, the measurement light is passed through a lens 13 through a $\lambda/4$ wavelength plate 12. If the laser beam were passed through a center of the lens 13, it would be reflected and returned by a thin plate 4 along the same path. Thus, the laser beam is passed through the lens 13 at a position having an offset larger than a beam diameter with respect to the optical center of the lens 13.

The measurement light branched by the polarization beam splitter is irradiated onto the thin plate 4 through the $\lambda/4$ wavelength plate 12 and the lens 13 to be reflected at a first time.

Then, the light is transmitted along the following path so that the light is again irradiated onto the thin plate 4 for an accurate measurement. Namely, the light reflected from the thin plate 4 is again transmitted through the lens 13 and $\lambda/4$ wavelength plate 12, thereby its polarization direction is changed by 90 degrees, and the light is again passed through the polarization beam splitter 11 to be reflected in a direction different from its incident direction. The transmitted light is irradiated onto a mirror 17 by a lens 16 at a focal point of the lens 16. For the same reason as in case of the lens 13, the light is passed through the lens 16 at a point having an offset larger than a beam diameter with respect to an optical center of the lens 16. The light is reflected from the mirror 17, collimated by the lens 16, again passed through the polarization beam splitter 11, and again irradiated to the same point of the thin plate 4, thereby a reflection at a second time is performed.

Further, in order to introduce the light to a light-receiving and computing section 302 for measuring the light, the polarization direction of the light is changed by again passing through the light the $\lambda/4$ wavelength plate 12 after collimating the light by the lens 13, and the light passes through the polarization beam splitter 11 to be introduced to the received-light and computing section 302 as a measurement light 18.

A reference light which is interfered with the measurement light 18, having a phase changed due to a change of position of the thin plate 4 so as to generate an interference fringe, is produced in accordance with the following procedures.

Namely, the reference light, reflected in a direction of 90 degrees by the polarization beam splitter 11 so as to be branched, is irradiated onto mirror 15 via $\lambda/4$ wavelength plate 14. The reflected light is again transmitted through the $\lambda/4$ wavelength plate 14, thereby its polarization surface is rotated by 90 degrees. Due to the change of the polarization surface, the light is transmitted through the polarization beam splitter 11. This transmitted light is focused on the mirror 17 by the lens 16, reflected by the mirror 17, and again transmitted through the polarization beam splitter 11 after passing through the lens 16. This transmitted light is again irradiated onto the mirror 15 through the $\lambda/4$ wavelength plate 14, and again passed through the $\lambda/4$ wavelength plate 14 so as to have its polarization surface rotated by 90 degrees. Due to the change of the polarization surface, the direction of the light is changed so as to be introduced to the light-receiving and computing section 302 as a reference light 19.

The light-receiving and computing section 302 receives a mixed light of the measurement light 18 and the reference light 19, and performs a computing process for computing phase differences so as to measure displacements of the surface of the thin plate.

In this apparatus, a travel of the measurement light is changed on the basis of a difference of a distance from the optical displacement gauge to the surface of the thin plate 4, whereas a travel of the reference light is constant. Accordingly, displacement of the surface of the thin plate can be determined by measuring a difference of travel between the measurement light and the reference light.

The measurement light 18 is transmitted to the thin plate surface at two times, and a displacement d of position of the thin plate surface can be accurately detected as a displacement of an optical path of 4d by the light-receiving and computing section 302.

The lens 13 which converges output light to be supplied to the thin plate can be provided between light branching and mixing section 304 and the thin plate.

The lens 13 has a function of narrowing the measurement light irradiated onto the thin plate, irradiating the measurement light only in a narrow range of the thin plate and increasing a measurement accuracy. The lens 13 functions to focus the measurement light irradiated onto the thin plate 4 so that the measurement light is irradiated only to a narrow area of the thin plate 4 for increasing measurement accuracy. Further, since the distance from the lens 13 to the thin plate 4 can be set to be small, it is possible to make a spot diameter on the thin plate small to about 0.01 mm, resulting in accurate measurement including measurement of surface roughness of the thin plate.

Further, a convergent optical system constituted by a focus lens converging the mixed light and supplying it to the light-receiving and computing section 302 may be provided between the light branching and mixing section 304 and the light-receiving and computing section 302. The convergent optical system is constituted by optical members such as a lens, mirror and the like. The convergent optical system improves an accuracy of measurement due to accurate receipt of the mixed light by a light receptive surface of the light-receiving and computing section 302. Generally, since the surface of the thin plate has an incline, the measurement light reflected from the surface of the thin plate has an incline or a deviation with respect to an optical path to the light-receiving and computing section 302. The incline or the deviation disturbs accurate receipt of the measurement light by the light receptive surface of the light-receiving and computing section 302. The convergent optical system provides secure convergence of the measurement light on the light receptive surface even if the incline or the deviation is generated.

In the configuration apparatus and method in accordance with the present invention, displacements on both surfaces of the thin plate are measured by a pair of optical displacement gauges. Based on these measurement results of the optical displacement gauges, thickness variation of the thin plate is measured. Further, measurement light is irradiated onto the thin plate twice. Therefore, correct and highly accurate measurement is achieved.

Although the present invention has been fully described by way of the examples with reference to the accompanying drawings, it is to be noted here that various changes and modifications will be apparent to those who are skilled in the art. Therefore, unless such changes depart from the spirit and scope of the present invention, they should be construed as being therein.

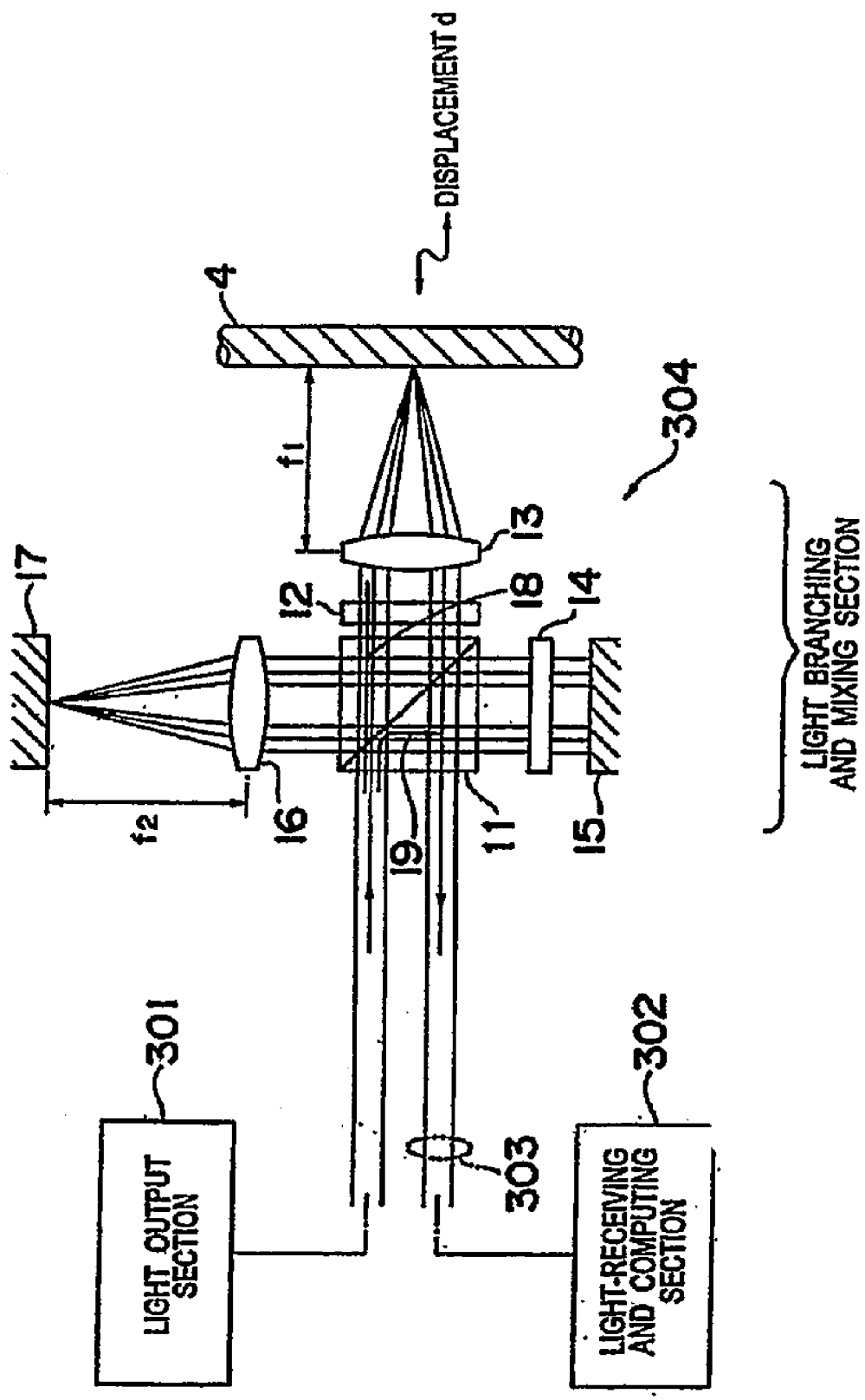

What is claimed is:

1. A configuration measuring apparatus comprising:
   a light source for emitting light having a wavelength $\lambda$;
   a first lens for focusing light emitted from said light source onto a portion of a surface of an object to be measured by having this light pass through said first lens at a position shifted from a center of said first lens;
   a polarization beam splitter for branching light emitted from said light source into first and second branches after this light has passed through said first lens, and for emitting light of the first branch onto the portion of the surface of the object so as to focus this light onto the portion of the surface of the object;
   a first $\lambda/4$ wavelength plate to be arranged between said polarization beam splitter and the surface of the object;
   a second lens for collimating light of the first branch by having this light pass through said second lens at a position shifted from a center of said second lens after this light has been reflected from the portion of the surface of the object and passed through said first $\lambda/4$ wavelength plate and said polarization beam splitter;
   a first mirror for reflecting light of the first branch that has passed through said second lens;
   a second $\lambda/4$ wavelength plate arranged between said first mirror and said polarization beam splitter;
   a second mirror for
   (i) reflecting, at a focal point of said second lens, light of the first branch that has been reflected from said first mirror and has passed through said second $\lambda/4$ wavelength plate, said second lens and said polarization beam splitter such that this light, after being so reflected by said second mirror, is passed through said polarization beam splitter, said second lens and said second $\lambda/4$ wavelength plate and reflected from said first mirror so as to pass through said second $\lambda/4$ wavelength plate, said second lens, said polarization beam splitter and said first $\lambda/4$ wavelength plate, and be again focused onto the portion of the surface of the object, and
   (ii) reflecting light of the second branch to said polarization beam splitter;
   a light receiving section for
   (i) receiving light of the first branch, that has been again focused onto the portion of the surface of object, after this light is reflected from the portion of the surface of the object and passed through said first $\lambda/4$ wavelength plate and said polarization beam splitter, and
   (ii) receiving light of the second branch that has been reflected by said second mirror and passed through said polarization beam splitter; and
   a computing section for measuring a configuration of the surface of the object based on an interference signal generated by light of the first and second branches after being received by said light receiving section.

2. The configuration measuring apparatus according to claim 1, further comprising a focus lens for focusing light of the first and second branches to said light receiving section.

3. The configuration measuring apparatus according to claim 1, wherein said light source comprises a laser light source of a single frequency such that light emitted from said light source is a linear polarization light having a polarization direction inclined at an angle of 45 degrees with respect to said polarization beam splitter.

4. The configuration measuring apparatus according to claim 1, further comprising a sensing pin reflector to be brought into contact with the surface of the object and moved following a configuration of the surface, said sensing pin reflector having a reflection surface for reflecting light of the first branch, wherein said sensing pin reflector is to correspond to the portion of the surface of the object.

5. The configuration measuring apparatus according to claim 1, wherein said first lens is arranged between said light source and said polarization beam splitter, and wherein a focal length of said first lens is larger than a focal length of said second lens.

6. A configuration measuring apparatus comprising:
   a light source for emitting light having a wavelength $\lambda$;
   a polarization beam splitter for branching light emitted from said light source into first and second branches, and for emitting light of the first branch onto a portion of a surface of an object to be measured;
   a first $\lambda/4$ wavelength plate to be arranged between said polarization beam splitter and the surface of the object;
   a first lens for focusing light of the first branch onto the portion of the surface of the object by having this light pass through said first lens at a position shifted from a center of said first lens after this light has passed through said first $\lambda/4$ wavelength plate, so as to focus this light onto the portion of the surface of the object;
   a first mirror for reflecting light of the first branch that has been reflected from the portion of the surface of the object and has passed through said first lens, said first $\lambda/4$ wavelength plate and said polarization beam splitter;
   a second $\lambda/4$ wavelength plate arranged between said first mirror and said polarization beam splitter;

a second lens for focusing light of the first branch that has been reflected from said first mirror and has passed through said second λ/4 wavelength plate and said polarization beam splitter by passing this light through said second lens at a position shifted from a center of said second lens;

a second mirror for
(i) reflecting, at a focal point of said second lens, light of the first branch that has passed through said second lens such that this light, after being so reflected by said second mirror, is passed through said second lens, said polarization beam splitter and said second λ/4 wavelength plate and reflected from said first mirror so as to pass through said second λ/4 wavelength plate, said polarization beam splitter, said first λ/4 wavelength plate and said first lens, and be again focused onto the portion of the surface of the object, and
(ii) reflecting light of the second branch to said polarization beam splitter;

a light receiving section for
(i) receiving light of the first branch, that has been again focused onto the portion of the surface of the object, after this light is reflected from the portion of the surface of the object and passed through said first lens, said first λ/4 wavelength plate and said polarization beam splitter, and
(ii) receiving light of the second branch after this light has been reflected by said second mirror and passed through said polarization beam splitter; and a computing section for measuring a configuration of the surface object based on an interference signal generated by light of the first and second branches after being received by said light receiving section.

7. The configuration measuring apparatus according to claim 6, further comprising a focus lens for focusing light of the first and second branches to said light receiving section.

8. The configuration measuring apparatus according to claim 6, wherein said light source comprises a laser light source of a single frequency such that light emitted from said light source is a linear polarization light having a polarization direction inclined at an angle of 45 degrees with respect to said polarization beam splitter.

9. The configuration measuring apparatus according to claim 6, further comprising a sensing pin reflector to be brought into contact with the surface of the object and moved following a configuration of the surface, said sensing pin reflector having a reflection surface for reflecting light of the first branch, wherein said sensing pin reflector is to correspond to the portion of the surface of the object.

10. A configuration measuring method comprising:
using a first lens to focus light having a wavelength λ so as to produce a focused light;
branching said focused light into first and second branches by passing said focused light through a polarization beam splitter;
focusing light of said first branch onto a portion of a surface of an object to be measured after passing said light of said first branch through a first λ/4 wavelength plate;
passing light of said second branch through said polarization beam splitter;
reflecting said light of said first branch from said portion of said surface of said object such that said light of said first branch passes through said first λ/4 wavelength plate and then through said polarization beam splitter;
using a second lens to collimate said light of said first branch, after said light of said first branch has passed through said polarization beam splitter, so as to produce a collimated light;
passing said collimated light through a second λ/4 wavelength plate two times, and then passing said collimated light through said second lens and said polarization beam splitter in succession so as to produce non-collimated light;
at a focal point of said second lens, reflecting said non-collimated light such that said non-collimated light passes through said polarization beam splitter;
using said second lens to collimate said non-collimated light after said non-collimated light has passed through said polarization beam splitter so as to produce again collimated light;
passing said again collimated light through said second λ/4 wavelength plate two times, and then passing said again collimated light through said second lens and said polarization beam splitter in succession so as to produce incoming light;
focusing said incoming light onto said portion of said surface of said object after passing said incoming light through said first λ/4 wavelength plate;
reflecting said incoming light from said portion of said surface of said object such that said incoming light passes through said first λ/4 wavelength plate and then through said polarization beam splitter;
causing said incoming light, after having passed through said polarization beam splitter, to interfere with said light of said second branch, after having passed through said polarization beam splitter, so as to produce interfered light;
after passing said interfered light through said first lens, irradiating said interfered light to a light receiving section; and
measuring a configuration of said surface of said object based on a signal generated by said interfered light in said light receiving section.

11. A configuration measuring method comprising:
branching light having a wavelength λ into first and second branches by passing said light through a polarization beam splitter;
focusing light of said first branch onto a portion of a surface of an object to be measured by passing said light of said first branch through a first λ/4 wavelength plate and a first lens;
at a focal point of a second lens, after passing light of said second branch through said second lens, reflecting said light of said second branch such that said light of said second branch again passes through said second lens and then passes through said polarization beam splitter;
reflecting said light of said first branch from said portion of said surface of said object such that said light of said first branch again passes through said first lens and said first λ/4 wavelength plate, and then passes through said polarization beam splitter;
passing said light of said first branch, after having passed through said polarization beam splitter, through a second λ/4 wavelength plate two times and then again through said polarization beam splitter;
at the focal point of said second lens, after said light of said first branch has again passed through said polarization beam splitter and after passing said light of said first branch through said second lens, reflecting said light of said first branch such that said light of said first branch again passes through said second lens and then further passes through said polarization beam splitter so as to produce incoming light;

passing said incoming light through said second λ/4 wavelength plate two times, and then passing said incoming light through said polarization beam splitter;

focusing said incoming light, after having passed through said polarization beam splitter, onto said portion of said surface of said object by passing said incoming light through said first λ/4 wavelength plate and said first lens;

reflecting said incoming light from said portion of said surface of said object such that said incoming light again passes through said first lens and said first λ/4 wavelength plate, and then again passes through said polarization beam splitter;

causing said incoming light, after having again passed through said polarization beam splitter, to interfere with said light of said second branch, after having passed through said polarization beam splitter, so as to produce interfered light;

irradiating said interfered light to a light receiving section; and measuring a configuration of said surface of said object based on a signal generated by said interfered light in said light receiving section.

12. A configuration measuring method comprising:

branching light having a wavelength λ into first and second branches by passing said light through a polarization beam splitter;

focusing light of said first branch onto a portion of a surface of an object to be measured by passing said light of said first branch through a first λ/4 wavelength plate and a first lens;

reflecting said light of said first branch from said portion of said surface of said object such that said light of said first branch again passes through said first lens and said first λ/4 wavelength plate, and then passes through said polarization beam splitter;

at a focal point of a second lens, after said light of said first branch has passed through said polarization beam splitter and after passing said light of said first branch through said second lens, reflecting said light of said first branch such that said light of said first branch again passes through said second lens and then again passes through said polarization beam splitter so as to produce incoming light;

focusing said incoming light onto said portion of said surface of said object by passing said incoming light through said first λ/4 wavelength plate and said first lens;

reflecting said incoming light from said portion of said surface of said object such that said incoming light again passes through said first lens and said first λ/4 wavelength plate, and then passes through said polarization beam splitter;

passing light of said second branch through a second λ/4 wavelength plate two times, and then passing said light of said second branch through said polarization beam splitter;

at the focal point of said second lens, after said light of said second branch has passed through said polarization beam splitter and after passing said light of said second branch through said second lens, reflecting said light of said second branch such that said light of said second branch again passes through said second lens and then again passes through said polarization beam splitter;

passing said light of said second branch, after having again passed through said polarization beam splitter, through said second λ/4 wavelength plate two times, and then passing said light of said second branch further through said polarization beam splitter;

causing said light of said second branch, after having further passed through said polarization beam splitter, to interfere with said incoming light, after having passed through said polarization beam splitter, so as to produce interfered light;

irradiating said interfered light to a light receiving section; and measuring a configuration of said surface of said object based on a signal generated by said interfered light in said light receiving section.

13. A configuration measuring apparatus comprising:

a light source for emitting light having a wavelength λ;

a polarization beam splitter for branching light emitted from said light source into first and second branches, and for emitting light of the first branch onto a portion of a surface of an object to be measured;

a first λ/4 wavelength plate to be arranged between said polarization beam splitter and the surface of the object;

a first lens for focusing light of the first branch onto the portion of the surface of the object by having this light pass through said first lens at a position shifted from a center of said first lens after this light has passed through said first λ/4 wavelength plate, so as to focus this light onto the portion of the surface of the object;

a second lens for focusing light of the first branch that has been reflected from the portion of the surface of the object, has again passed through said first lens and said first λ/4 wavelength plate, and has passed through said polarization beam splitter, by passing this light through said second lens at a position shifted from a center of said second lens;

a first mirror for reflecting, at a focal point of said second lens, light of the first branch that has passed through said second lens such that this light, after being so reflected by said second mirror, is passed through said second lens, said polarization beam splitter, said first λ/4 wavelength plate and said first lens so as to be again focused onto the portion of the surface of the object;

a second mirror for reflecting light of the second branch;

a second λ/4 wavelength plate arranged between said second mirror and said polarization beam splitter;

a light receiving section for
  (i) receiving light of the first branch, that has been again focused onto the portion of the surface of the object, after this light is reflected from the portion of the surface of the object and passed through said first λ/4 wavelength plate and said polarization beam splitter, and
  (ii) receiving light of the second branch after this light has been reflected by said second mirror and passed through said polarization beam splitter; and a computing section for measuring a configuration of the surface of the object based on an interference signal generated by light of the first and second branches after being received by said light receiving section.

14. The configuration measuring apparatus according to claim 13, further comprising a focus lens for focusing light of the first and second branches to said light receiving section.

15. The configuration measuring apparatus according to claim 13, wherein said light source comprises a laser light source of a single frequency such that light emitted from said light source is a linear polarization light having a polarization direction inclined at an angle of 45 degrees with respect to said polarization beam splitter.

16. The configuration measuring apparatus according to claim 13, further comprising a sensing pin reflector to be brought into contact with the surface of the object and moved following a configuration of the surface, said sensing pin reflector having a reflection surface for reflecting light of the first branch, wherein said sensing pin reflector is to correspond to the portion of the surface of the object.

\* \* \* \* \*

UNITED STATES PATENT AND TRADEMARK OFFICE
CERTIFICATE OF CORRECTION

| | | |
|---|---|---|
| PATENT NO. | : 6,934,036 B2 | Page 1 of 3 |
| APPLICATION NO. | : 10/140815 | |
| DATED | : August 23, 2005 | |
| INVENTOR(S) | : Kubo et al. | |

It is certified that error appears in the above-identified patent and that said Letters Patent is hereby corrected as shown below:

DELETE DRAWING SHEETS 7 & 8 AND SUBSTITUTE THEREFOR THE DRAWING SHEETS CONSISTING OF FIGS 8 & 9 AS SHOWN ON THE ATTACHED PAGES

Signed and Sealed this

Twenty-sixth Day of December, 2006

JON W. DUDAS
*Director of the United States Patent and Trademark Office*